US011237616B1

(12) United States Patent
Shah et al.

(10) Patent No.: US 11,237,616 B1
(45) Date of Patent: Feb. 1, 2022

(54) GOVERNING POWER BUDGET WITH TOKEN PASSING

(71) Applicant: International Business Machines Corporation, Armonk, NY (US)

(72) Inventors: Parth Sanjaybhai Shah, Bangalore (IN); Ranjal Gautham Shenoy, Bangalore (IN); Vaidyanathan Srinivasan, Bangalore (IN); Alper Buyuktosunoglu, White Plains, NY (US); Augusto Vega, Mount Vernon, NY (US); Pradip Bose, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/940,171

(22) Filed: Jul. 27, 2020

(51) Int. Cl.
*G06F 1/00* (2006.01)
*G06F 1/324* (2019.01)
*G06F 1/26* (2006.01)
*G06F 1/3237* (2019.01)

(52) U.S. Cl.
CPC .............. *G06F 1/324* (2013.01); *G06F 1/263* (2013.01); *G06F 1/3237* (2013.01)

(58) Field of Classification Search
CPC ......... G06F 1/263; G06F 1/324; G06F 1/3237
See application file for complete search history.

(56) References Cited

U.S. PATENT DOCUMENTS

| 7,930,578 B2 | 4/2011 | Bose et al. |
| 2008/0263373 A1* | 10/2008 | Meier ................. G06F 9/3017 713/300 |
| 2009/0089602 A1 | 4/2009 | Bose et al. |

(Continued)

FOREIGN PATENT DOCUMENTS

TW 201428464 A 7/2014

OTHER PUBLICATIONS

Cebrian et al., "Power Token Balancing: Adapting CMPs to Power Constraints for Parallel Multithreaded Workloads", Proceedings of the 25th International Parallel & Distributed Processing Symposium, May 16-20, 2011, Anchorage, Alaska, USA, 13 pages.

(Continued)

*Primary Examiner* — Nitin G Patel
(74) *Attorney, Agent, or Firm* — William H. Hartwell; Edward J. Wixted, III

(57) ABSTRACT

A method, computer program product, and/or system associates a number of tokens with a plurality of frequency domains (for example, cores) of a central processing unit (CPU) computer chip. The number of tokens allotted to the CPU is based on the CPU power budget. Cores are organized as a ring topology. A token pool traverses the ring, picks up excess tokens from cores having excess tokens, and gives the tokens to cores that need additional tokens. Tokens acquired by a core allows the core to increase operating frequency by an increment represented by the tokens. Consequently, power usage is weighted toward heavily loaded cores and away from lightly loaded cores. Overall power (Continued)

usage of the CPU remains within a power budget. The method budgets power optimally to sustain turbo frequencies for longer durations by not allowing control units to increase frequency in absence of any useful high frequency benefiting workload.

20 Claims, 12 Drawing Sheets

(56) References Cited

U.S. PATENT DOCUMENTS

| | | | | |
|---|---|---|---|---|
| 2014/0136858 | A1* | 5/2014 | Jacobson | G06F 9/46 713/300 |
| 2014/0143558 | A1* | 5/2014 | Kuesel | G06F 1/26 713/300 |
| 2015/0089254 | A1* | 3/2015 | Burns | G06F 1/3293 713/320 |
| 2016/0291658 | A1 | 10/2016 | Kim et al. | |
| 2017/0255247 | A1 | 9/2017 | Ardanaz | |
| 2020/0065686 | A1 | 2/2020 | Vega et al. | |

OTHER PUBLICATIONS

Nelson et al., "Distributed Power Management of Real-time Applications on a GALS Multiprocessor SOC", Proceedings of the International Conference on Embedded Software (EMSOFT), Oct. 4-9, 2015, Amsterdam, The Netherlands, 10 pages, <www.es.ele.tue.nl/~kgoossens/2015-emsoft.pdf>.

Rosendahl, Todd, "On Chip Controller (OCC) Overview", Open Power Summit 2015, 14 pages, <https://openpowerfoundation.org/blogs/on-chip-controller-occ/>.

Rotem et al., "Power-Management Architecture of the Intel Microarchitecture Code-Named Sandy Bridge", IEEE Micro—Micro. 32., 2012, pp. 20-27, <https://ieeexplore.IEEE.org/document/6148200>.

"Power Distribution in Computer System", Patent Cooperation Treaty Patent Application No. EP2021/062781, filed on May 13, 2021, 41 pages.

Patent Cooperation Treaty, International Searching Authority, Notification of Transmittal of the International Search Report and the Written Opinion of the International Searching Authority, or the Declaration, dated Aug. 4, 2021 (dated Apr. 8, 2021), International application No. PCT/EP2021/062781, International filing date May 13, 2021 (May 13, 2021), 13 pages.

* cited by examiner

Algorithm 1 TokenGov Initialization

1: procedure INIT
2:     $tokenPool \leftarrow 200$
3:     $turn \leftarrow 0$
4:     For N FDs, $P_i.tokens \leftarrow 0, i\epsilon[0, N)$
5:     Spawn N Policy Daemon $P_N$
6:     for i in 0..15 do
7:         DAEMON(i)

Fig. 6A

Algorithm 2 mips

1: procedure CALCMIPS(P)
2:     $ips \leftarrow max(IPS_0, IPS_1, ...IPS_{15})$
3:     $std \leftarrow \sigma(mips[0], mips[1], ...mips[15])$
4:     $mips[top] \leftarrow ips$
5:     $std2 \leftarrow \sigma(mips[0], mips[1], ...mips[15])$
6:     /* if change in std is <5% then set new MIPS */
7:     if $(|std - std2| \div std) < 0.05$ then
8:         $MIPS \leftarrow max(mips[0], mips[1], ...mips[15])$
9:     /* Else ignore current IPS */
10:     $P.MIPS \leftarrow MIPS$

Fig. 6B

Algorithm 3 Increase token request count

1: procedure INCTOKENS(P)
2:     /* tokens to be accepted */
3:     if $P_i.lastTokenRequest * 2 > P_i.request$ then
4:        $P_i.request \leftarrow P_i.request$
5:     else
6:        $P_i.request \leftarrow P_i.lastTokenRequest * 2$
7:     if $P_i.request > 100$ then
8:        $P_i.request = 100$
9:     $lastTokenRequest \leftarrow P_i.request$

Fig. 6C

Algorithm 4 Daemon Thread per FD

```
1:  procedure DAEMON(ID)
2:      i ← ID
3:      winSize ← 10
4:      mips[winSize] ← 0
5:      MIPS ← 0
6:      prevMIPS ← 0
7:      /* Track MIPS in case of load increase */
8:      trackMIPS ← False
9:      /* Requesting token is incremental starting from 1 */
10:     lastTokenRequest ← 0

11:     while true do
12:         /* Wait for the tokenPool to reach to use */
13:         while(turn! = i);
14:         $P_i.load \leftarrow max(L_0, L_1, ...L_{15})$
15:         $P_i.required = P_i.load$ 16:         if $P_i.required > P_i.tokens$ then
17:             request = $P_i.required - P_i.tokens$
18:             incTokens(P)
19:             calcMIPS($P_i$)
20:             /* If we already gave token previously but MIPS
21:             do not increase then exit */
22:             if trackMIPS == True AND MIPS < prevMIPS then
23:                 goto exit
24:             else
25:                 if trackMIPS == False then
26:                     trackMIPS ← True
27:             /* Accept tokens from pool */
28:             if tokenPool > $P_i.request$ then
29:                 $P_i.tokens \leftarrow P_i.tokens + P_i.request$
30:                 tokenPool ← tokenPool − $P_i.request$
31:             else
32:                 $P_i.tokens \leftarrow P_i.tokens + tokenPool$
33:                 tokenPool ← 0
34:         else
35:             /* Donate tokens */
36:             extra ← $P_i.tokens - P_i.required$
37:             tokenPool ← tokenPool + extra
38:             $P_i.tokens \leftarrow P_i.tokens - extra$
39:         exit:
40:         turn ← (turn + 1) mod N
41:         Set frequency ← $P_i.tokens$
42:         /* While loop ends here */
```

Fig. 6D

GOVERNING POWER BUDGET WITH TOKEN PASSING

STATEMENT REGARDING FEDERALLY SPONSORED RESEARCH OR DEVELOPMENT

This invention was made with Government support under contract number HR-0011-18-C-0122 awarded by Defense Advanced Research Projects Agency (DARPA). The Government has certain rights to this invention.

BACKGROUND

The present invention relates generally to the field of power usage in a computer, and more particularly to efficiently distributing power among frequency domains such as central processing unit (CPU) cores, and among CPUs in a multi-CPU computer system.

An electronic component consumes (dissipates) power to operate, which generates heat within the component. The heat causes a temperature to rise within the component. Cooling systems that carry away the heat help to manage the component temperature. Another way to manage the temperature is to govern the power used by the component. For example, a central processing unit (CPU) may be associated with a power budget that limits the power usage above which the CPU is not allowed to operate. An on-chip controller (OCC) throttles the CPU operating frequency to prevent exceeding the power budget limit.

SUMMARY

According to an aspect of the present invention, there is a method, computer program product and/or system that performs the following operations (not necessarily in the following order): (i) receiving, by a token pool, a power allowance request from a first power consuming device, of a plurality of power consuming devices of an integrated circuit; (ii) in response to receiving the power allowance request, determining a second power consuming device, of the plurality of power consuming devices, has a power allowance surplus; (iii) in response to determining the second power consuming device has a power allowance surplus, receiving the power allowance surplus from the second power consuming device; (iv) transferring, via the token pool, the power allowance surplus to the first power consuming device; and (v) in response to transferring the power allowance surplus to the first power consuming device: (a) increasing a first power usage limit corresponding to the first power consuming device, based on the power allowance surplus, and (b) decreasing a second power usage limit corresponding to the second power consuming device, based on the power allowance surplus.

BRIEF DESCRIPTION OF THE DRAWINGS

FIG. 6A is a pseudo-code listing showing an approach for initializing the token pool in accordance with at least one embodiment of the present invention;

FIG. 6B is a pseudo-code listing showing an approach for computing millions of instructions per second (MIPS), in accordance with at least one embodiment of the present invention;

FIG. 6C is a pseudo-code listing showing an approach for requesting additional tokens, in accordance with at least one embodiment of the present invention; and FIG. 6D is a pseudo-code listing showing an approach for a daemon thread corresponding to a frequency domain (FD), in accordance with at least one embodiment of the present invention.

DETAILED DESCRIPTION

Figure 1:
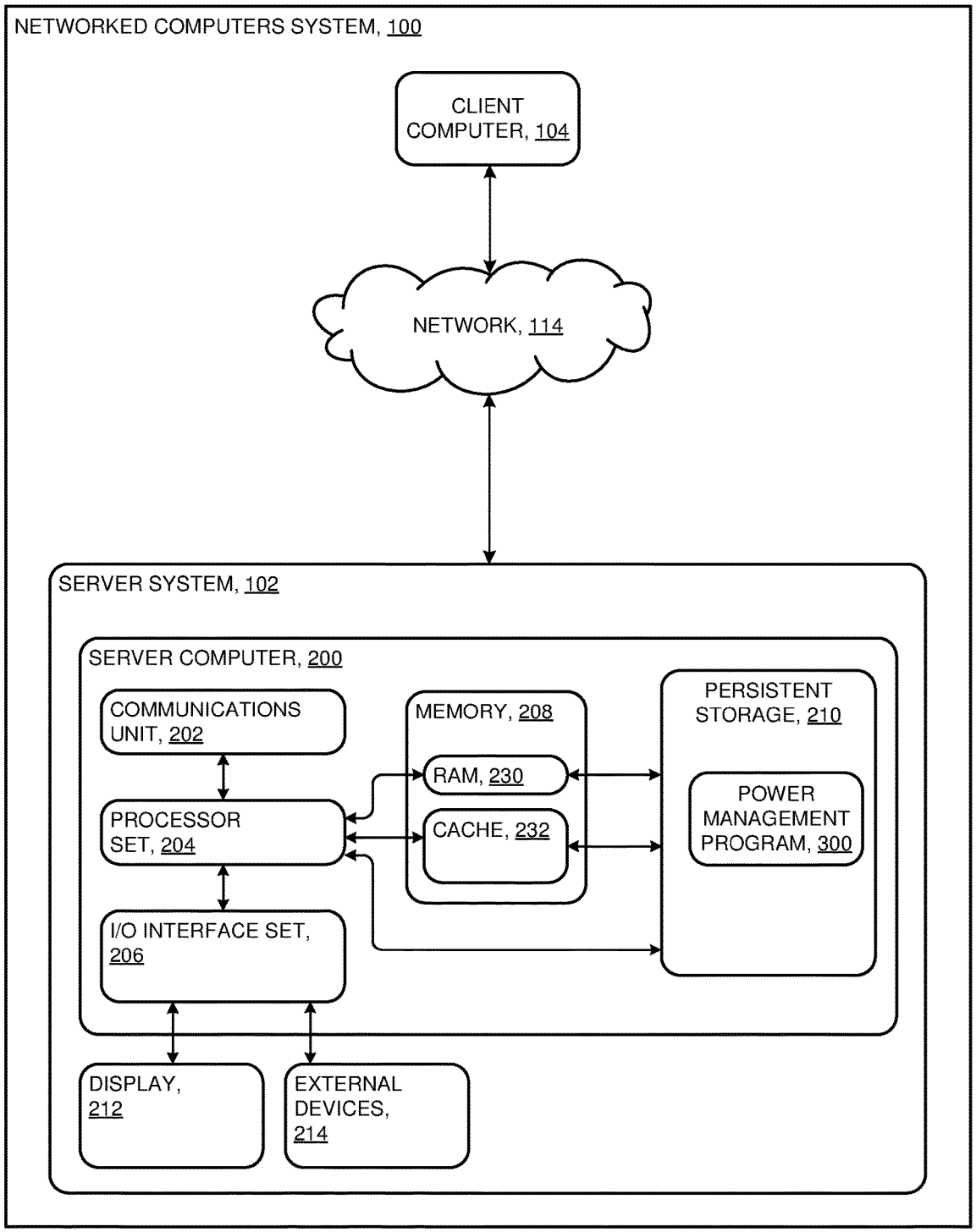
FIG. 1 is a functional block diagram of a system in accordance with at least one embodiment of the present invention.

In some embodiments of the present invention, a power management system employs a ring topology (a distributed token passing mechanism) to distribute a fixed number of power tokens among frequency domains of an electronic module. Each power token represents a fraction of the total power the electronic module is permitted to dissipate. The fixed number of power tokens collectively represent the pre-determined maximum power consumption (dissipation) budgeted for the electronic module.

An electronic module may have several frequency domains. Each frequency domain operates at a clock frequency that is controllable and independent of other frequency domains of the electronic module. A higher operating frequency means the frequency domain can process workload at a higher rate, while consequently dissipating more power. In some embodiments, a CPU core (in a multiple core CPU) is an example of such a frequency domain. Power dissipated by the several frequency domains fluctuates according to respective workloads. The power management system offers power tokens from a rotating token pool, which polls or addresses, in round-robin fashion (using a ring topology), each frequency domain in turn. A frequency domain, in conjunction with interacting with the token pool, may accept additional tokens from the token pool if needed (and available), or donate unneeded tokens to the token pool. A frequency domain in need of more power tokens (in a "power deficit" state) when the token pool has no power tokens (or not enough power tokens) available will wait for tokens to be relinquished by other frequency domains to the token pool. Other frequency domains, at their respective turns interacting with the token pool, may respond by placing unneeded (surplus) power tokens onto the token pool. Once the token pool circles back around and again interacts with the power deficit domain, the power deficit domain can acquire the available power tokens from the token pool.

A frequency domain operates at a frequency in accordance with the number of power tokens held by the frequency domain. Overall, an electronic module (having multiple frequency domains) stays within an assigned power budget (represented by the total number of power tokens distributed among the multiple frequency domains), while performing its workload more efficiently.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server system 102; client computer 104; communication network 114; server computer 200; communications unit 202; processor set 204; input/output (I/O) interface set 206; memory 208; persistent storage 210; display 212; external devices 214; random access memory (RAM) 230; cache memory 232; and power management program 300.

Server system 102 is, in many respects, representative of the various computer sub-system(s) in the present invention. Accordingly, several portions of server system 102 will now be discussed in the following paragraphs.

Server system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Power management program 300 is a collection of machine readable instructions and/or data that is used to create, manage, and control certain software functions that will be discussed in detail, below, in the Example Embodiment sub-section of this Detailed Description section.

Server system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Server system 102 is shown as a block diagram with many double arrows. These double arrows (no separate reference numerals) represent a communications fabric, which provides communications between various components of server system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for server system 102; and/or (ii) devices external to server system 102 may be able to provide memory for server system 102.

Power management program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Power management program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to server system 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external devices 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, power management program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
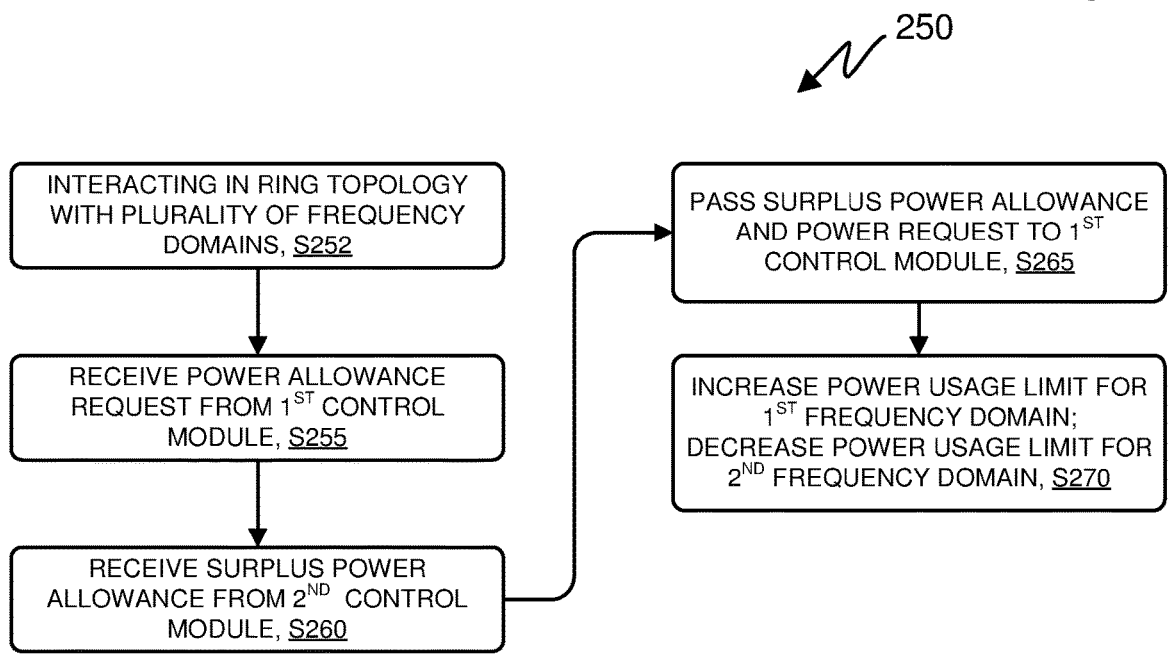
FIG. 2 is a flowchart showing a method performed, at least in part, in accordance with at least one embodiment of the present invention.
Figure 3:
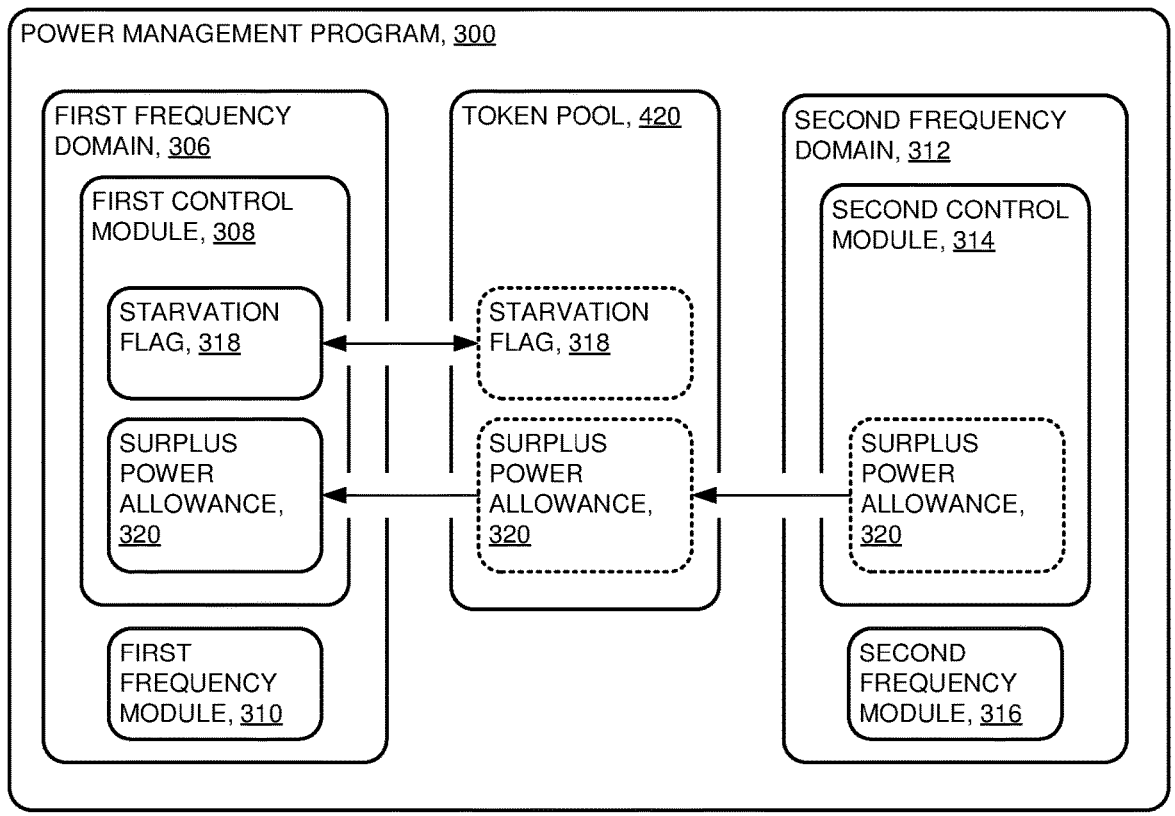
FIG. 3 is a block diagram showing a machine logic (for example, software) portion of a system in accordance with at least one embodiment of the present invention.

FIG. 2 shows flowchart 250 depicting a method according to the present invention. FIG. 3 shows power management program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252, where token pool 420, of power management program 300, traverses a plurality of frequency domains of an integrated circuit chip. In some embodiments, the integrated circuit chip is a central processing unit (CPU), and each frequency domain, for example first frequency domain 306 and second frequency domain 312, is a core of the CPU. The frequency domains are organized in a ring topology. Token pool 420 traverses around the ring indefinitely, interacting in turn with each frequency domain. At each interaction between token pool 420 and a frequency domain, various events may take place including, but not limited to: (i) token pool 420 receives token(s) from the frequency domain; (ii) token pool 420 gives token(s) to the frequency domain; (iii) token pool 420 receives a "starvation" flag from the frequency domain, which signals that the frequency domain is in need for more tokens. At some interactions, neither tokens nor "starvation" flag are passed between token pool 420 and the frequency domain.

As token pool 420 traverses the ring, tokens tend to migrate away from frequency domains that have excess tokens, and to frequency domains that need more tokens. A token represents an increment of power or operating frequency that the frequency domain in possession of the token may use. The total number of tokens assigned to the CPU represents the total power the CPU may consume, thus keeping the CPU within a power budget so as not to exceed physical cooling capacity (and consequently temperature limits) of the CPU.

Constrained by the total number of tokens for the CPU, power management program 300 distributes the tokens among the frequency domains based on the relative workloads of the frequency domains. Heavily loaded frequency domains, therefore, tend to possess more tokens, and consequently may operate at higher frequencies (consume more power), so as to perform the workload more quickly. The converse holds true for lightly loaded frequency domains.

Processing proceeds at operation S255, where token pool 420, of power management program 300, interacts with first control module 308, of first frequency domain 306 of power management program 300. In connection with the interaction, token pool 420, receives starvation flag 318 from first control module 308. Starvation flag 318 is sometimes herein referred to as a "starvation token", a "power request", a "power allowance request", or similar terms. In some embodiments, starvation flag 318 includes information indicating a magnitude of power allowance requested by first control module 308. Starvation flag 318 indicates that first control module 308, due to current workload, requests permission to consume more power so as to process the current workload (or backlog thereof) more quickly. In some embodiments, control modules not running a heavy workload voluntarily donate excess tokens to the token pool, even in the absence of a starvation flag. The starvation flag is a new feature added to a conventional system that operates under "altruistic" (fair distribution based on workload requirements) principles. The starvation flag may indicate that the associated control unit urgently needs additional tokens to start performing an operation.

Token pool 420 interacts alternately with first control module 308 and second control module 314. Some embodiments have many of frequency domains and many respectively corresponding control units. Regardless of how many frequency domains (and corresponding control units) are present in an embodiment, the frequency domains are organized into a ring topology. Token pool 420 interacts with the many control units in sequence around the ring topology, conducting interactions with the control units ad infinitum.

The embodiment depicted in FIGS. 2 and 3 has two frequency domains (first frequency domain 306 and second frequency domain 312) and two respectively corresponding power control modules (first control module 308 and second control module 314). Token pool 420 interacts with first control module 308, second control module 314, and repeats this sequence ad infinitum, shifting relative power usage by the two control units according to current relative workloads being processed by the corresponding frequency domains (306 and 312). This approach maintains the total power usage of the two frequency domains within a predetermined limit such that: (i) cooling load does not exceed the capacity of the cooling system; (ii) device junction temperatures do not exceed design limits; (iii) device temperatures are not exceeded; and/or (iv) reliability requirements are not negatively impacted, etc.

Processing proceeds at operation S260, where token pool 420 interacts with second control module 314, of second frequency domain 312, of power management program 300. In connection with the interaction, second control module 314, having surplus power allowance available, and upon detecting starvation flag 318 present in token pool 420, relinquishes to token pool 420, surplus power allowance 320. In some embodiments, surplus power allowance 320 has a power allowance magnitude up to the magnitude requested by starvation flag 318.

By relinquishing surplus power allowance 320, second frequency module 316 decreases the operating frequency of second frequency domain 312. The amount of decrease in operating frequency is based on surplus power allowance 320. The decrease in operating frequency means that second frequency domain 312 operates at a slower speed, consuming less power while performing assigned workload more slowly. This is a desirable consequence of relinquishing surplus power allowance 320 because the current workload assigned to second frequency domain is such that frequency domain 312 is idle for some time. Therefore, frequency domain 312 can still process workload in a timely fashion with less (or no) idle time.

Processing proceeds at operation S265, where token pool 420 again interacts with first control module 308. In connection with the interaction, token pool 420 transfers surplus power allowance 320 to first control module 308.

Processing proceeds at operation S270, where first frequency module 310, of first frequency domain 306, of power management program 300, increases the operating frequency of first frequency domain 306. The amount of increase in operating frequency is based on surplus power allowance 320. The increase in operating frequency means that first frequency domain 306 operates at a faster speed, consumes more power, and performs assigned workload more quickly.

In some embodiments, first frequency domain 306 and second frequency domain 312 are physically integrated on a common device, such as (without limitation) a central processing unit (CPU) or other integrated circuit chip (not shown in the Figures). The increase in power used by first frequency domain 306 is offset by the decrease in power used by second frequency domain 312. Consequently, the power collectively used by both frequency domains, and the cooling load of the common device, remains without significant change.

III. Further Comments and/or Embodiments

An electronic module may comprise a single integrated circuit chip, such as (but not limited to) a central processing unit (CPU), a set of integrated circuit chips mounted in a common package, a circuit card such as a computer motherboard, comprising many components, circuits in a smartphone, a single-board computer, a memory card, a storage controller, and any electronic device with an identifiable set of electronic devices operatively coupled and/or operating in concert. For simplicity herein, the terms "CPU" and "chip" should be understood as being synonymous and to encompass at least the above mentioned devices.

Some embodiments of the present invention may include one, or more, of the following features, characteristics, and/or advantages: (i) the total number of power tokens assigned to a chip is based, at least in part, on the power budget for the chip; (ii) passing the tokens (and corresponding power usage allowance) among frequency domains on the chip shifts the power requirements for respective frequency domains, while keeping the chip within the power budget limit; (iii) a distributed frequency control algorithm ensures the system power budget limits are honored; (iv) minimizes on chip control (OCC) throttling due to power budget constraints; (v) sustains workload-optimized-frequency (WOF) ranges for longer duration; and/or (vi) maximizes workload throughput across frequency domains.

In some embodiments of the present invention, a power management system comprises a token pool that performs a token passing strategy, in round-robin fashion with a plurality of distributed control units, to efficiently shift power allowances (power tokens) among frequency domains respectively corresponding to the control units. The power management system initializes with: (i) a fixed number of power tokens in the token pool, and (ii) a "starvation flag" associated with ("owned" by) each control unit with which the control unit can request fair policy in the case of longer starvation. This system minimizes meta-data needed for organization and control, and consequently can be scaled to a system of any size without increasing complexity.

In some embodiments, each control unit (CU) retains only the number of tokens of which the CU can make use. This number of "useful" tokens is determined based on CU utilization and instructions per second (IPS) values. The combination of utilization and IPS values determines whether granting a token to the CU would be useful. If the CU has excess tokens (tokens which the CU is not using), it may donate the excess tokens to the token pool, ensuring that no CU holds unnecessary tokens. If a CU is in a starvation state for more than a threshold length of time, then the CU may raise a starvation flag after which no CU holds onto more than an average number of tokens. The starvation flag is removed once the "starving" CU gets sufficient tokens (which is guaranteed since the control units switch to operating in a "fair" policy).

In some embodiments, a frequency domain may set a maximum operating frequency (thus power consumption) based on the number of tokens held by the corresponding control unit. The frequency domain need not always operate at the maximum operating frequency, but may operate: (i) at the maximum frequency; (ii) a lower frequency; or (iii) workload optimized frequency (turbo WOF) that may exceed the "maximum frequency". A control unit that gives up power tokens to the token pool lowers maximum operating frequency of the corresponding frequency domain, based on the number of token given up.

In some embodiments, power tokens represent increments of power usage allowance by any power consuming device, whether electronic, mechanical, electromechanical, chemical, hydraulic, etc., operating singly or together in any combination. Power usage may be controlled by modulating electrical, chemical, and/or physical characteristics such as operating speed, torque, force, frequency, oscillating amplitude, intensity (such as electromagnetic or acoustic radiation), impedance, flow rate, temperature, duty cycle, pressure, etc. Embodiments disclosed herein with respect to frequency domains of an electronic device are not to be construed to exclude any other embodiments such as those discussed above in this paragraph.

Some embodiments of the present invention identify the parameters (for example, instruction per second (IPS) and task utilization) that are necessary and sufficient for determining the number of power tokens required to meet the energy requirements of a given frequency domain. A power token represents an allowance to use an increment of power.

A control unit may authorize an associated frequency domain to use an amount of power up to that represented by the number of power tokens held by the control unit. Some embodiments assign a default (base) amount of power to a frequency domain. Power tokens held by the control unit permit the frequency domain to increase power usage above the base by an increment up to that represented by the number of power tokens the control unit holds. Some embodiments assign the control unit a default number of power tokens, and assign the frequency domain a default amount of power. If the frequency domain uses less than the default amount of power (meaning the frequency domain has a power surplus), the control unit may pass to the token pool some or all of the power tokens held by the control unit.

In some embodiments, a given frequency domain is in a state of power deficit when the frequency domain's power requirements exceed the power allowance. In this case, workload assigned to the given frequency domain cannot be processed in a timely manner. In response, when the token pool interacts with the given control unit (associated with the given frequency domain), the control unit passes a starvation flag to the token pool if, for example, the control unit faces frequency deficit for some threshold of time. Subsequently, when the token pool interacts with other control units as it travels around the ring, the other control units (i) detect the starvation flag, (ii) limit themselves to an upper limit of power tokens that they can consume, and (iii) relinquish excess (surplus) power tokens to the token pool. When the token pool again comes around to the given control unit, the control unit picks up the surplus power tokens and removes the request token from the token pool (assuming enough power tokens to satisfy the power deficit were acquired). The control unit then increases the power usage allowance for the given frequency domain. In response, the frequency domain operates at an increased frequency (and consequently consumes more power) to process the assigned workload more quickly. Thus the power deficit is partly or fully eliminated within the time the token pool takes to traverse once around the ring.

Figure 4A:
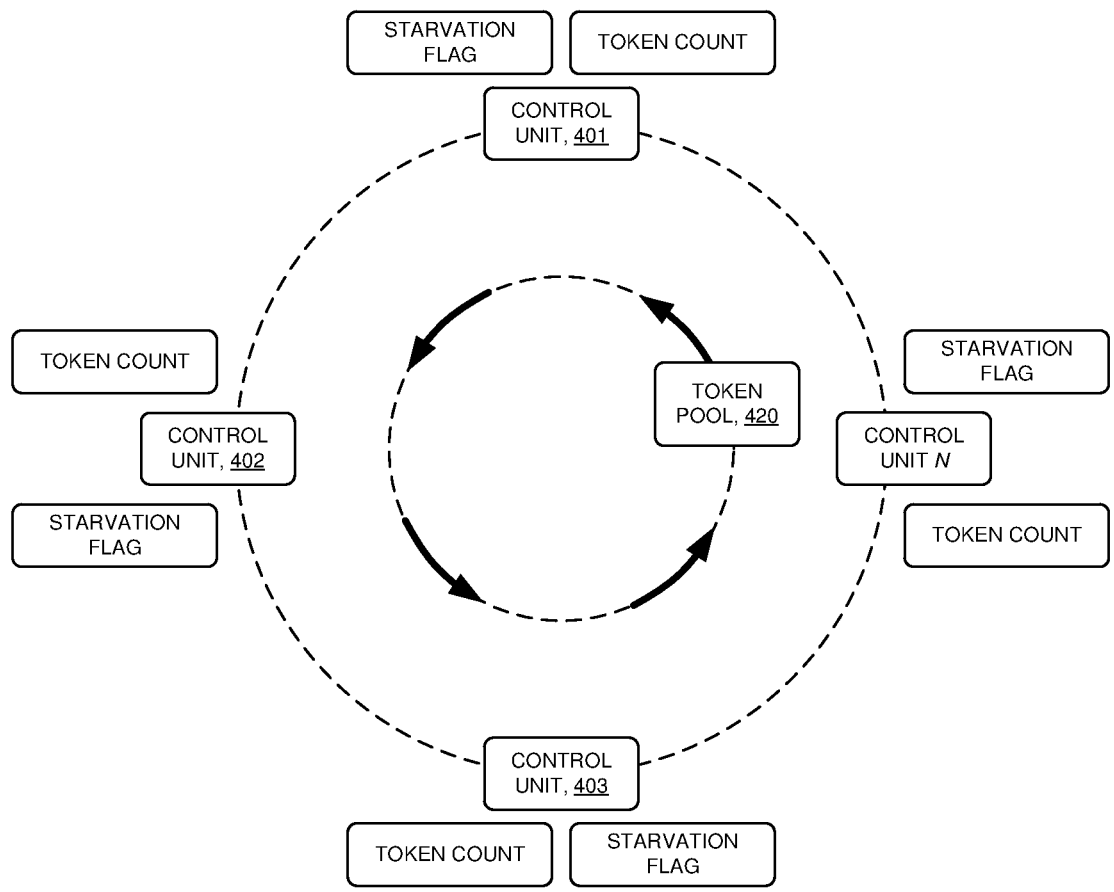
FIG. 4A is a schematic diagram of a ring topology in accordance with at least one embodiment of the present invention.

FIG. 4A is a schematic diagram of a ring topology, in accordance with some embodiments of the present invention, including: control unit 401; control unit 402; control unit 403; and token pool 420. Token pool 420 repeatedly (iteratively) cycles through the ring topology, interacting in turn with all control units during each cycle. Each control unit is associated with, manages, and/or governs a frequency domain (not shown in the Figures) with respect to power usages allowed for each of the frequency domains. Each control unit is associated with a respectively corresponding starvation flag and a token count (the number of tokens held by the control unit). The ring topology may comprise any number of control units and respectively corresponding frequency domains.

In some embodiments, the order in which token pool 420 interacts with the control units is dynamic, effectively altering the ordering of control units in the ring topology. In at least one embodiment, alteration of the ordering of control units is triggered by a high-priority need of a particular control unit for more tokens. In an example scenario, token pool 420 receives a signal indicating a high priority control unit has a need for more power tokens. In response, token pool 420 services the high priority mission as follows: (i) breaks out of the normal ring sequence; (ii) picks up surplus tokens from one or more donor control units; (iii) delivers the surplus tokens to the high priority control unit; and/or (iv) resumes normal processing at the place in the normal ring sequence where it broke out to service the high priority mission.

In another example embodiment, consider a control unit that is processing a high priority task and needs more tokens. If there is a donor, then it is guaranteed that once the token pool reaches the donor, the donor donates all excess tokens to the token pool. Once the token pool again comes around to the control unit with the high priority task, the token pool transfers the excess tokens to the control unit. In some embodiments, a high priority task is identified based on: (i) instructions per second (IPS) processed by the frequency domain; and (ii) utilization of the frequency domain. A control unit calculates a required number of tokens based locally on IPS and utilization parameters.

In some embodiments, some control units are given relative weights (based on importance). The token pool interacts with the control units in a frequency based on the weights. For example, consider a ring topology comprising five control units (C1, C2, C3, C4, and C5), where C1 is given a weight of "2" and C2 through C5 are each given a weight of "1". The token pool interacts with the control units in the following sequence: C1, C2, C3, C1, C4, C5, C1, C2 . . . etc., interacting with C1 twice as frequently as with each of the others.

In some embodiments, a control unit manages more than one frequency domain with respect to power distribution and allocation among the frequency domains. In some embodiments, a single control unit manages a plurality of frequency domains, on an integrated circuit chip. In some embodiments, a single control unit manages a plurality of frequency domains, distributed among one or more integrated circuit chips.

In some embodiments, more than one control unit manages a single frequency domain. For example, a redundancy scheme sets three control units in charge of the frequency domain. The control units operate on a voting system that requires agreement between at least two control units for taking action (donating or accepting tokens to or from the token pool, for example). In this way, a single control unit failure does not impact operation of the power management system with respect to the frequency domain.

In some embodiments of the present invention, at each interaction with a control unit, token pool 420 may perform one or more of the following actions (without limitation): (i) pass token(s) to the control unit; (ii) receive token(s) from the control unit; (iii) receive a starvation flag from the control unit; (iv) return a power request token to the control unit; (v) exchange status information (unidirectionally, or bidirectionally) with the control unit; and/or (vi) take no action.

Figure 4B:
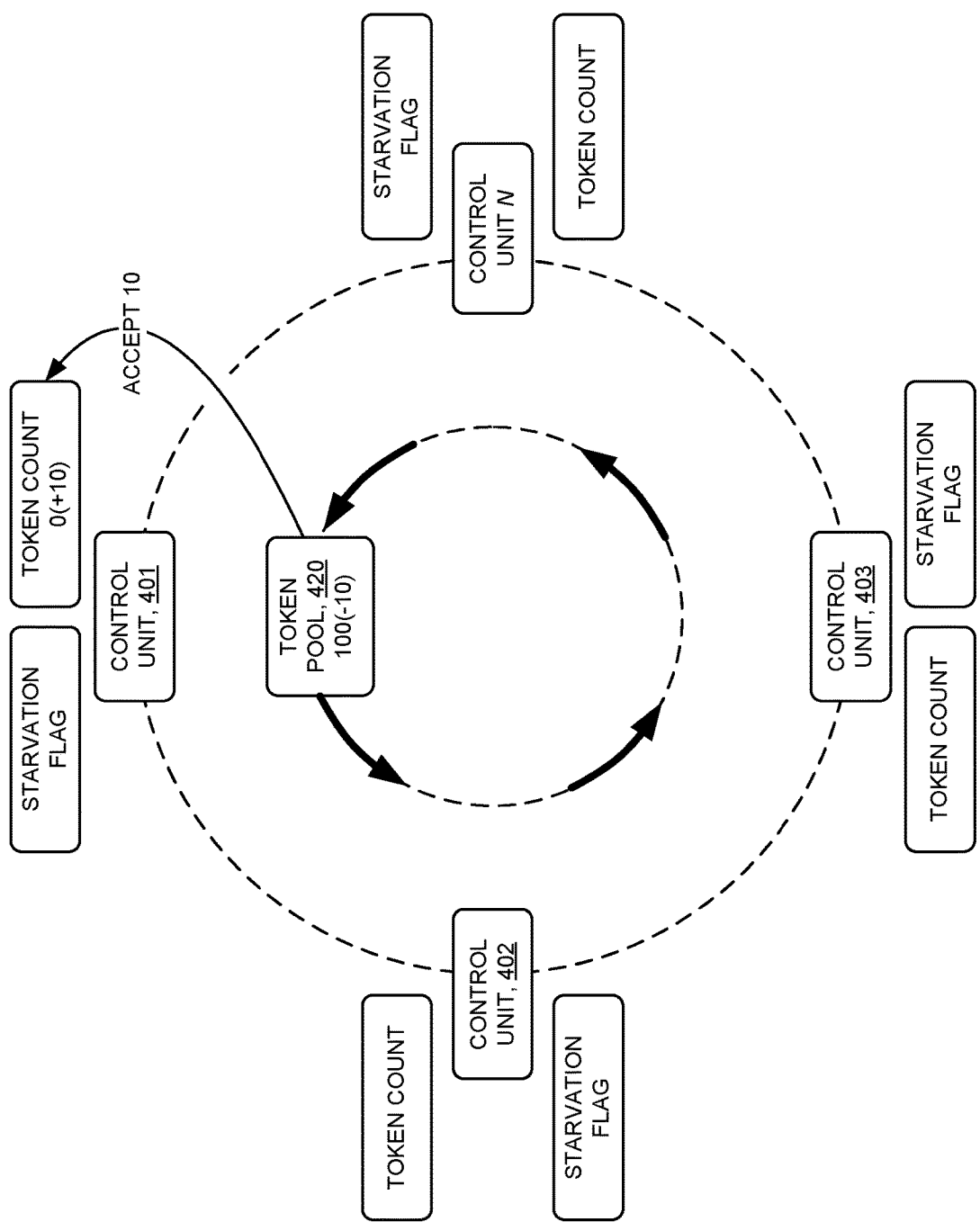
FIG. 4B is a schematic diagram of a ring topology in accordance with at least one embodiment of the present invention.

FIG. 4B is a schematic diagram showing a control unit accepting power tokens from the token pool in accordance with some embodiments of the present invention. In particular, token pool 420 initially has 100 power tokens and control unit 401 has none. Token pool 420 transfers ten of the 100 power tokens to control unit 401. After the transfer, token pool 420 has 90 tokens and control unit 401 has 10. Consequently, control unit 401 allows the corresponding frequency domain (not shown) to increase power consumption by an increment not exceeding the power represented by the ten tokens.

Figure 4C:
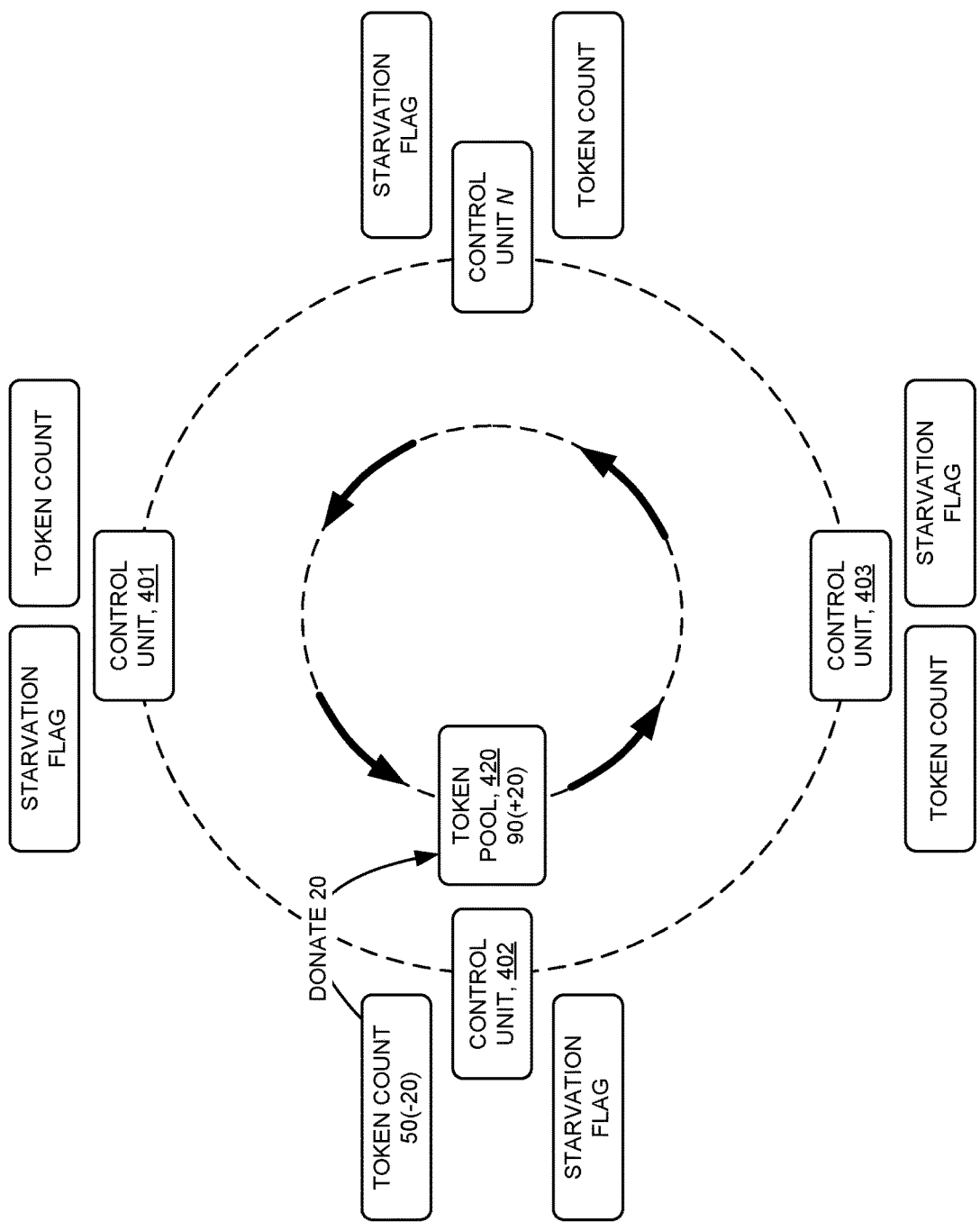
FIG. 4C is a schematic diagram of a ring topology in accordance with at least one embodiment of the present invention.

FIG. 4C is a schematic diagram showing a control unit donating power tokens a token pool, in accordance with some embodiments of the present invention. In particular, token pool 420 initially has 90 power tokens and control unit 402 has 50. Control unit 402 donates 20 tokens (may, or may not, represent surplus power tokens) to token pool 420. After the transfer, token pool 420 has 110 tokens (90+20=110), and control unit 402 has 30 tokens (50−20=30). Consequently, control unit 402 reduces the power usage limit of corresponding frequency domain (not shown) by an increment represented by the 20 tokens donated. Note that if a CU donates tokens to the token pool, the tokens may be surplus tokens (of which the CU does not need and/or cannot make use of), or tokens in excess of an average number of tokens donated due to presence of the starvation flag.

Figure 4D:
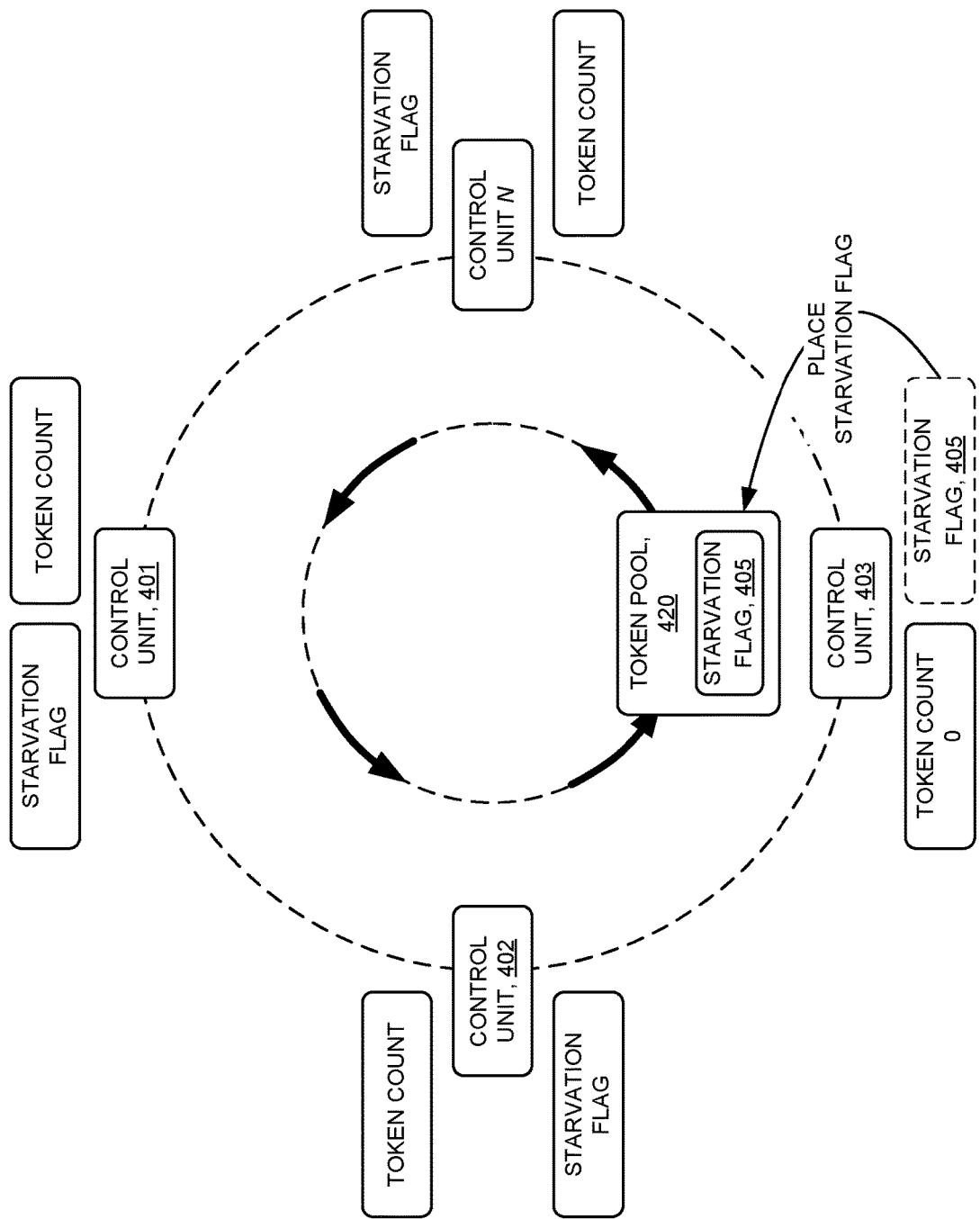
FIG. 4D is a schematic diagram of a ring topology in accordance with at least one embodiment of the present invention.

FIG. 4D is a schematic diagram showing placement of a power request token by a control unit onto the token pool in accordance with some embodiments of the present invention. In particular, control unit 403 has a power deficit, and places starvation flag 405, asking for 50 power tokens, onto token pool 420. Token pool 420 continues around the ring topology, interacting with the other control units one by one, in turn.

In some embodiments, token pool 420 interacts with the control units based on control unit activity. That is, token pool 420 assumes an idle state until a control unit issues an interrupt signal. In response, token pool 420 interacts with the signaling control unit. Once token pool 420 determines the reason why the control unit issued the signal (for example to donate excess power tokens to token pool 420), token pool 420 takes appropriate action (for example to receive the excess power tokens and deliver the donated power tokens to a "needy" control unit. Once no more action is called for, token pool 420 re-enters the idle state.

In some embodiments, a starvation flag specifies a number of tokens requested by the associated control unit, called the "remaining to be filled" number (RTBF number). The token pool collects up to the RTBF number of power tokens, earmarks them for delivery to the requesting control unit, and delivers the power tokens to the requesting control unit in satisfaction of the starvation flag. The token pool then returns the starvation flag (or otherwise cancels the starvation flag) to the requesting control unit.

In some embodiments, the token pool is unable to collect the requested number of power tokens in the first trip around the ring. The token pool continues going around the ring, gathering and earmarking tokens as they are made available by the other control units, and transferring the earmarked power tokens to the requesting control unit. Upon transferring earmarked power tokens, the token pool decrements the RTBF number by the number of power tokens transferred to the requesting control unit. Once the RTBF number reaches zero, the request has been fulfilled, and the token pool transfers the power request token back to the requesting control unit.

In some embodiments, the token pool takes on board multiple power request tokens from multiple respectively corresponding requesting control units. As the token pool gathers surplus tokens, it may use any suitable method to earmark the gathered surplus tokens among the multiple requesting control units until all requests have been fulfilled. In some embodiments, surplus tokens are allotted preferentially to higher priority control units. In some embodiments, the surplus tokens are allotted in proportion to the numbers requested (and/or based on the respective RTBF numbers) by the multiple control units.

Figure 4E:
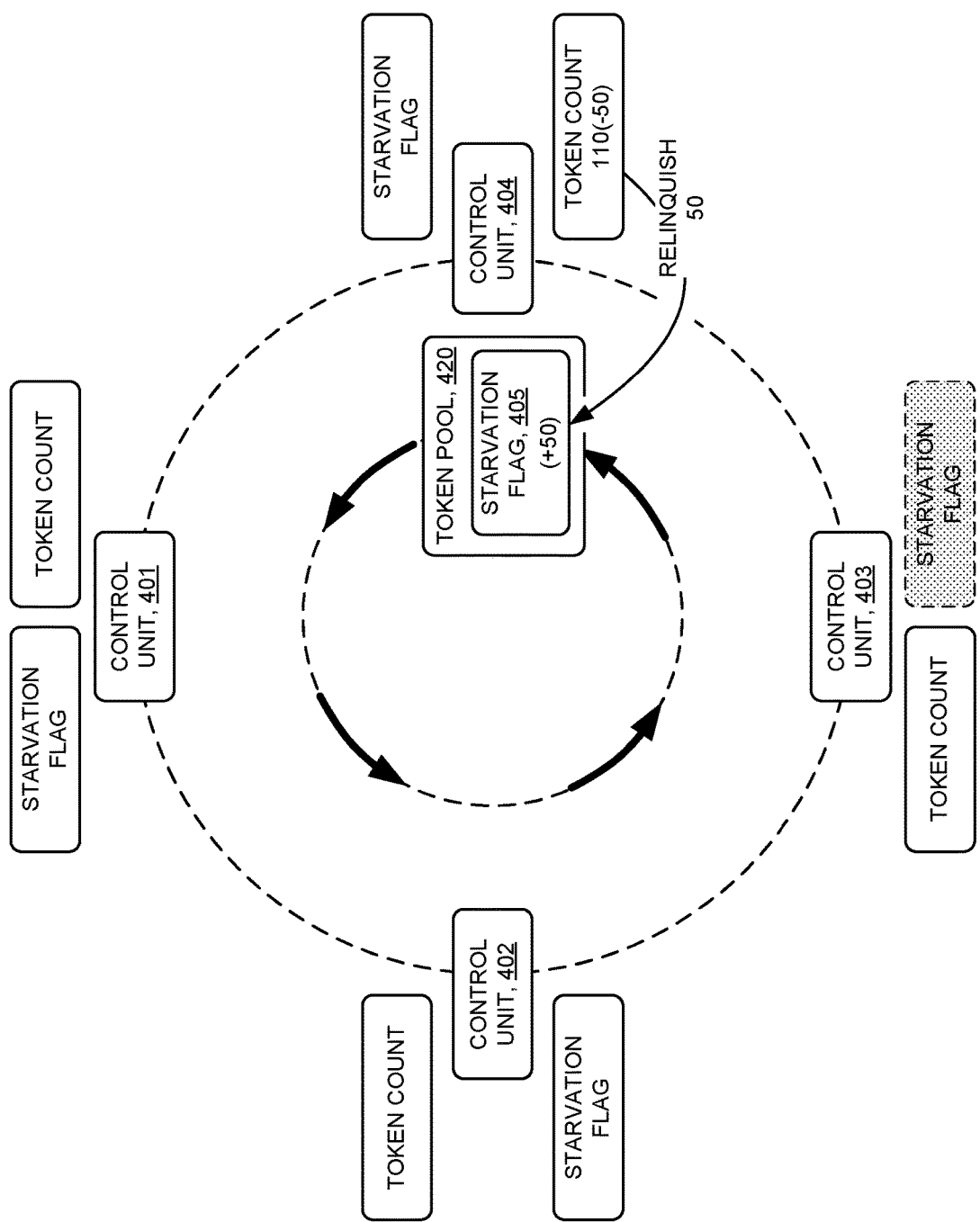
FIG. 4E is a schematic diagram of a ring topology in accordance with at least one embodiment of the present invention.

FIG. 4E is a schematic diagram showing relinquishment of power tokens, in response to starvation flag 405, in accordance with some embodiments of the present invention. As discussed above with respect to FIG. 4D, control unit 403 placed starvation flag 405 onto token pool 420. Token pool 420 subsequently moves around the ring topology, and interacts next with control unit 404. Control unit 404 has 50 surplus power tokens, and in response to detecting starvation flag 405 present in token pool 420, transfers the 50 surplus tokens to token pool 420. Token pool 420 earmarks the 50 tokens for delivery to control unit 403 in fulfillment of starvation flag 405.

In some embodiments, if the token pool is not able to acquire all the token(s) requested by a control unit in a power deficit state (a "needy" control unit) within a predetermined time interval, the control unit raises a starvation flag. In response, the power management system initiates a token leveling process, based on "fair" token distribution to mitigate the power deficit. In the mitigation process, a power request token, placed on the token pool by the needy control unit, signals to the other control units to relinquish a certain amount of tokens (whether surplus or not) to create "fair token distribution" across all control units. Once the needy control unit puts the request token into the token pool, other control units (contributing control units) relinquish excess tokens to the token pool. If some (or all) other control units have no excess tokens, they nevertheless give up some tokens. The token pool transfers the tokens given up by the contributing control units, to the needy control unit, thereby effectively shifting some power usage from the contributing control units to the needy control unit. This levels out, at least to some extent, the power usage among all the control units while remaining within total power budgeted for the control units collectively.

Figure 4F:
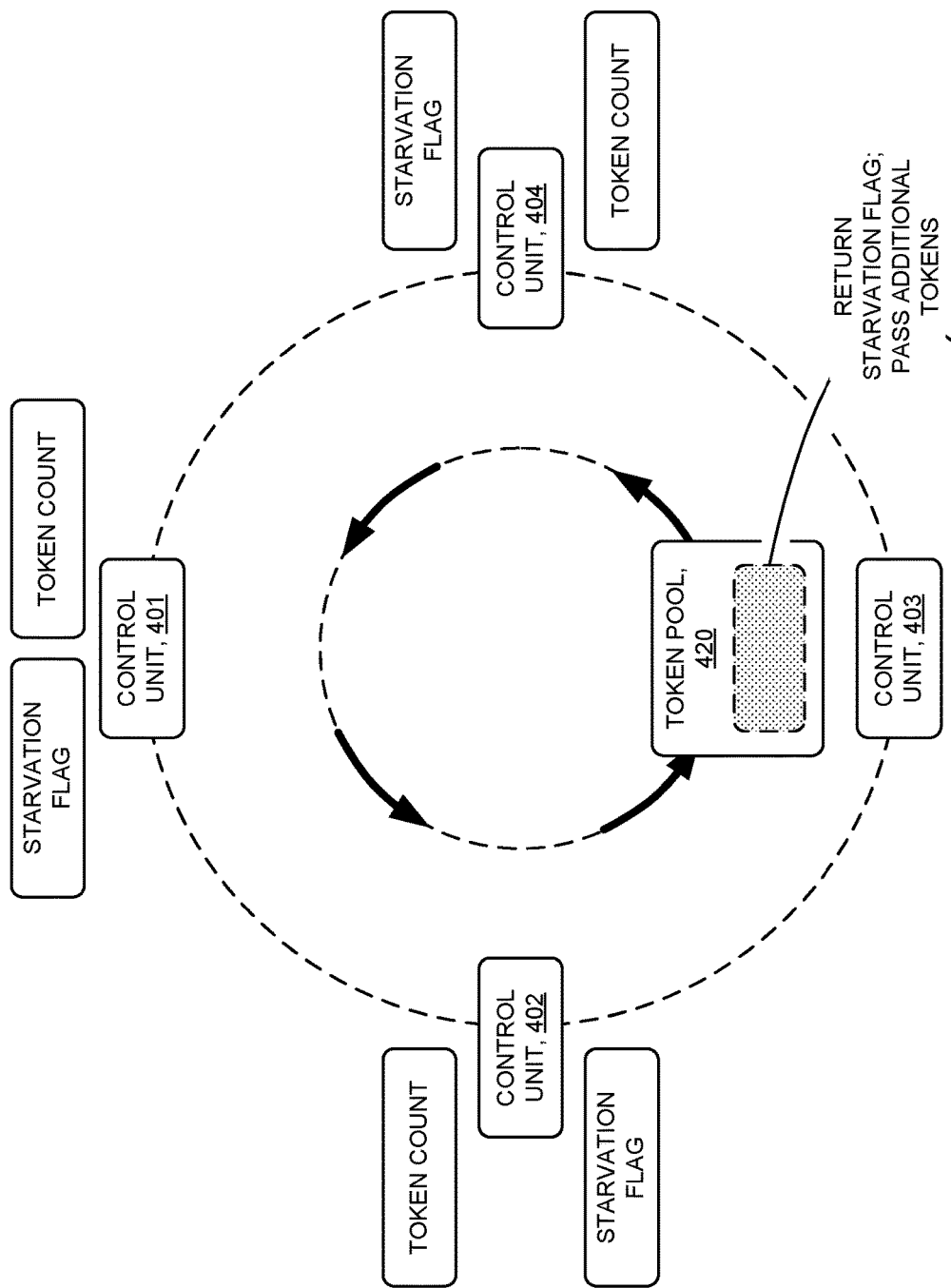
FIG. 4F is a schematic diagram of a ring topology in accordance with at least one embodiment of the present invention.

FIG. 4F is a schematic diagram showing fulfilment of starvation flag 405, upon return of token pool 420 to control unit 403. As discusses above with respect to FIG. 4E, control unit 404 relinquished 50 tokens in response to starvation flag 405. Once token pool 420 back around to control unit 403, token pool 420 transfers, to control unit 403, starvation flag 405 and the 50 surplus tokens contributed by control unit 404.

Control unit 403, authorizes the associated frequency domain to increase operating frequency by an amount based on the 50 additional power tokens now in possession of control unit 403. The frequency domain subsequently processes workload more quickly at the expense of consuming more power, yet the total power used by all the frequency domain participants of the ring topology, in aggregate, remains within the established power budget.

Figure 5:
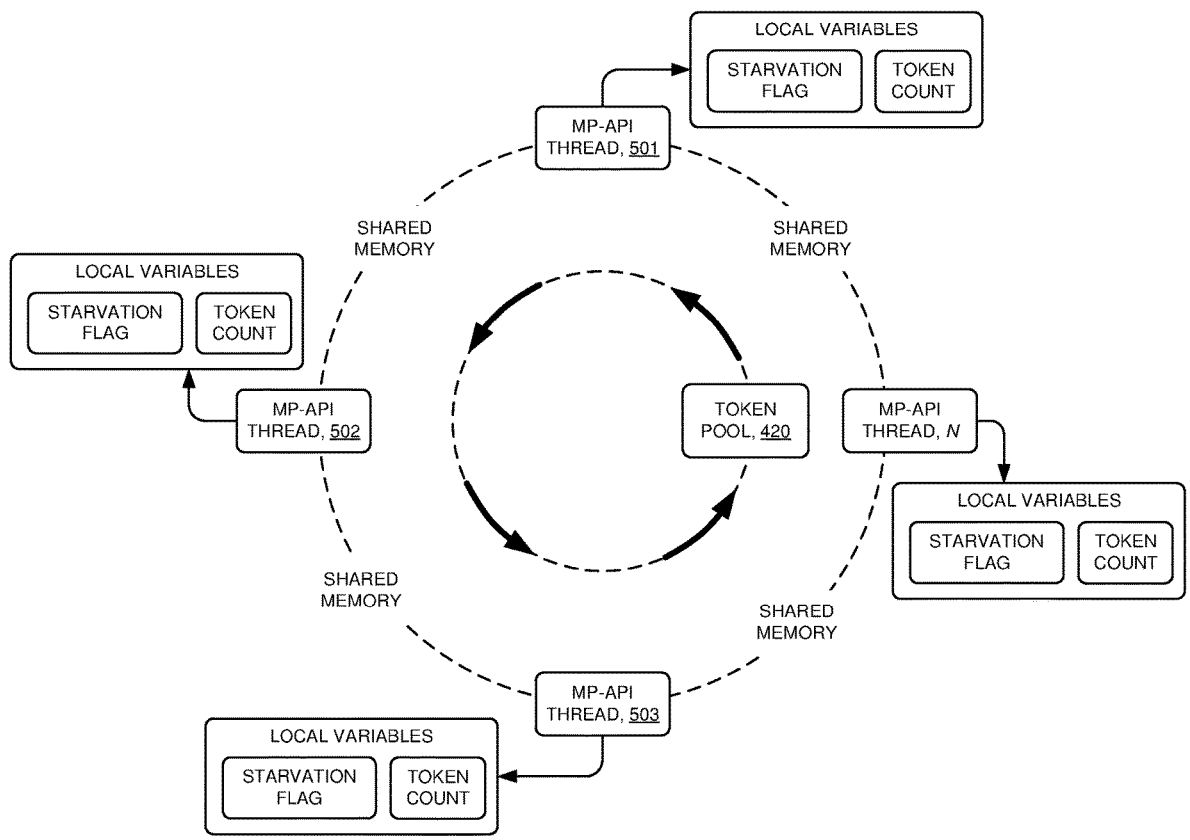
FIG. 5 is a schematic diagram of a ring topology in accordance with at least one embodiment of the present invention.

FIG. 5 is a schematic diagram showing operation of a system in accordance with some embodiments of the present invention. A token passing model can be adapted to various layers of computing stacks such as a hardware stack or a software stack. In a hardware stack, control units may be discrete modules or physical circuits on an integrated chip, for instance. At a hardware level, in some embodiments, each on chip control (OCC) represents the control units, where shared memory represents the token passing mechanism.

In contrast, a control unit implemented in a user space layer of a software stack, comprises threads in an open multi-processing application programming interface (MP-API) that passes tokens using shared memory based approaches. Still with respect to user space, some embodiments treat MP-API threads (for instance, MP-API thread 501, MP-API thread 502, and MP-API thread 503 . . . MP-API thread N) as control units, and pass the token pool on to neighboring threads, with the use of shared memory, as shown in FIG. 5. Moreover, in software implementations, both the user space and kernel space applications can inherit token passing models.

Some embodiments use MP-API processes as control units, and pass tokens among different systems by using a message passing interface (MPI).

In some embodiments, a scheduling policy within the kernel layer of an operating system, represents the control units that use shared memory to pass tokens.

In some embodiments, MP-API processes comprise control units and the token pool is passed on by the use of a message passing interface.

Some embodiments of the present invention involve devices other than control units of an integrated circuit chip. For example, the techniques described herein can be applied to servers in a rack of servers, wherein tokens distributed among the servers in the rack govern the power usage allowed for each server. A heavily loaded server can have more tokens (and therefore be allowed to dissipate more power) than less heavily loaded servers in the rack. By this method, the servers in the rack, in total, do not exceed a power budget limit for the rack as a whole, yet maximizing the workload performed by the servers therein.

The same techniques can be applied to an entire data center in a nested fashion, whereby (i) a first level of tokens govern power distribution among parts of an integrated circuit chip of a server in a rack in a data center; (ii) a second level of tokens govern power distribution among components (for example, integrated circuit chips, circuit modules, circuit cards and circuit boards, storage devices, power supply, network adapters, memory, storage, etc.) of the server; (iii) a third level of tokens govern power distribution among a plurality of servers in the rack; and/or (iv) a fourth level of tokens govern power distribution among a group of racks.

Some embodiments of the present invention use token passing in a ring topology to govern power distribution within and/or among other types of power consuming devices, such as for example, transportation systems, automobiles, communication systems, networking systems, manufacturing systems, power generation systems, marine craft, aircraft, spacecraft, etc.

FIG. 6A is a pseudo-code listing showing an approach for initializing the token pool in accordance with at least one embodiment of the present invention.

FIG. 6B is a pseudo-code listing showing an approach for computing millions of instructions per second (MIPS) in accordance with at least one embodiment of the present invention.

FIG. 6C is a pseudo-code listing showing an approach for requesting additional tokens in accordance with at least one embodiment of the present invention.

FIG. 6D is a pseudo-code listing showing an approach for a daemon thread corresponding to a frequency domain (FD) in accordance with at least one embodiment of the present invention.

Some embodiments of the present invention may recognize one, or more, of the following facts, potential problems, and/or potential areas for improvement with respect to the current state of the art: (i) some central processing units (CPUs) have a well-defined power budget above which they are not allowed to operate; (ii) an on-chip controller (OCC) throttles CPU frequency to prevent the CPU exceeding a limit imposed by the power budget; (iii) some CPU frequency governors do not account for the power budget, but instead change the core operating frequencies according to core utilization, without feedback as to whether the CPU benefits from the changed frequencies; (iv) a distributed approach may produce indefinite power starvation across frequency domains; (v) does not consider the problem of resource starvation; and/or (vi) may overutilize some resources while other resources are underutilized or idle.

At least one embodiment of the present invention may include one, or more, of the following features, characteristics, and/or advantages: (i) implements an efficient scheme for setting respective operating frequencies of various CPU cores, such that the overall system power budget is not exceeded; (ii) avoids centralized bottlenecks, by selectively distributing power among the cores; (iii) redirects power/energy to parts of the system that are in most need of the power without starving other parts of the system; (iv) allows a subset of CPU cores to operate at higher than rated frequencies while maintaining the system power budget under control; (v) uses a distributed token passing mechanism among frequency domains to determine achievable frequencies in accordance with operating conditions, and changes thereof; (vi) allots a number of tokens for a circuit chip (for example, a CPU chip) based on the power budget for the chip; (vii) shifts the tokens (hence power usage allowances) among frequency domains of the chip, while maintaining chip total power usage within the budgeted limit; (viii) implements a distributed frequency control algorithm to ensure the system power budget limits are honored; (ix) minimizes on-chip controller (OCC) throttling due to the power budget constraints; (x) sustains workload-optimized-frequency (WOF) ranges for a longer durations; (xi) avoids indefinite power starvation across frequency domains which is a known problem with a distributed approach; and/or (xii) requires a minimum of metadata to implement, hence is scalable to a system of any size without significant increase in message complexity.

A number of tokens assigned to a chip determines, at least in part, the granularity (in terms of power increment) for power distribution among parts of the chip. For example, consider a coarse granularity for a chip with a power budget of 20 watts, to which 20 tokens are assigned. Power distribution among various frequency domains of the chip can be modified in increments of 1.0 watt (20 watts/20 tokens=1.0 watt/token). In a finer granularity embodiment, 100 tokens are assigned to the chip. Power distribution can then be modified in increments of 0.2 watts (20 watts/100 tokens=0.2 watts/token).

In some embodiments, a number of tokens assigned to a chip determines, at least in part, the granularity (in terms of operating frequency increment) for governing power distribution among parts of the chip. For example, consider a coarse granularity for a chip with a nominal operating frequency of 3.0 GigaHertz (3.0 GHz, meaning 3,000,000,000 cycles per second) for which 1,000 tokens are assigned. Operating frequencies of various frequency domains of the chip can be modified in increments of 3.0 MegaHertz (3.0 MHz, meaning 3,000,000 cycles per second) (3.0 GHz/1000 tokens=3.0 MHz/token). In a finer granularity embodiment, 300 million (300,000,000) tokens are assigned to the chip. Operating frequencies of the various frequency domains can then be modified in increments of 10 Hz (3 GHz/300,000,000 tokens=10 Hz/token).

In some embodiments of the present invention, a ring topology (i) arranges distributed control units for efficiently carrying out the distributed power-shifting, and/or (ii) defines a token passing strategy in the form of a rotating token pool that "travels" around the ring. The system (comprising control units and the token pool) is initialized with a fixed number of tokens in the token pool. Each control unit has a special token (a starvation flag) for indicating power starvation.

Some embodiments identify parameters (for example, instructions per second (IPS), task utilization, duty cycle, etc.) that are necessary and sufficient to determine how many tokens from the pool are required to meet the energy requirements for each control unit.

In some embodiments of the present invention, a mechanism, whereby a control unit acquires tokens without indefinitely starving other control units of power, comprises the following procedure: (i) a control unit is in a state of "power starvation" when one (or more) of the control unit's energy requirements is not met, based on the available number of tokens—in response, the control unit drops a special "power request token" into the token pool; (ii) when the token pool traverses around the ring and interacts with other control units, the other control units detect the power request token, and respond by relinquishing excess tokens, beyond those which they can consume (based on current power usages), back into the pool; (iii) the token pool eventually returns to the control unit in the "power starvation" state, transfers the excess tokens to the control unit, thus curing, or at least mitigating, the "power starvation" within a single trip around the ring; and/or (iv) the control unit that is no longer in a power starvation state removes its special power request token from the token pool.

In some embodiments of the present invention, a strategy for achieving a global (with respect to a whole chip having multiple frequency domains, for example) energy constraint via local (at the frequency domain level, for example) decisions comprises: 1) maintaining a power budget; and 2) sustaining a higher than rated frequency, sometimes referred to as turbo frequency, or workload optimized frequency, as next described.

1) Maintaining a Power Budget: Depending on the power budget for a module (a CPU for example), some embodiments increase or decrease the number of tokens in the pool such that the sum of the power consumed by the individual control units does not exceed the power budget. The number of tokens held by each control unit limits the power consumed by the control unit. In other words, the maximum allowed power consumed by a control unit is a function of the number of tokens held by the control unit.

In some embodiments, the function is linear, meaning the power limit is directly proportional to the number of tokens. Some embodiments employ a non-linear functional relationship between tokens and power consumption limit, in order to disproportionally skew power usage toward more heavily loaded control units, to allow them to process workload much faster, or to skew power usage disproportionally toward less heavily loaded control units so that more work can be directed thereto.

2) Sustaining turbo (WOF) frequency: When one or more cores (of a CPU for instance, or a frequency domain of any module) are idle, an active core can sustain a higher than rated frequency, provided the number of tokens the active core holds exceeds a default minimum number of tokens.

In some embodiments, the operating algorithm is generic in nature such that it can be implemented across any system infrastructure stack. For instance, the algorithm can be easily scaled across a cluster of nodes, or the algorithm can be implemented on some system cores that can act as control units. The algorithm is scalable without having (or at least minimizing) the problem of power starvation among control units.

An operating algorithm in accordance with some embodiments of the present invention comprises the following components: 1) initialization of the token pool; 2) useful load calculation; 3) token to frequency mapping; and/or 4) power starvation flag (sometimes herein referred to as "starvation token"). These components are next described:

1) Initialization of the token pool: Defines the total number of tokens available in the system. The combined value of the tokens is mapped to the power budget constraints in the system.

2) Useful load calculation: Each control units calculates the load from the system utilization and the millions of instructions per second (MIPS) value which can distinguish between "frequency variant" and "frequency invariant" workloads. This leads to better token allocation among the control units as the frequency invariant tasks do not need to be given tokens, which instead can be given to other tasks to sustain a higher frequency for a longer duration.

3) Token to Frequency Mapping: Each control unit, based on a computation of useful load that can be processed by a corresponding frequency domain, receives or releases token(s) respectively from or to the rotating token pool. The operating algorithm then maps the available token(s) to the frequency achievable by the control unit.

4) Power starvation flag: Each control unit, upon not getting the tokens required to meet their current utilization needs for a certain threshold, is considered to be in a state of power starvation. In response, such a control unit places a "starvation flag" into the rotating token pool (refer to FIG. 4D). The power starvation flag mandates each control unit to release extra tokens such that every control unit still has a "fair" number of tokens. This evens out frequency demands (thus power allowance distribution) among contending control units.

Some embodiments of the present invention may include one, or more, of the following features, characteristics, and/or advantages: (i) when implemented in kernel space (for example, an operating system kernel), allows a system to sustain higher turbo frequencies for longer durations as compared to conventional approaches; (ii) results in higher throughput and lower latencies; (iii) are based on global power constraints of the system; (iv) makes uses of a MIPS metric to calculate useful workload capacities; and/or (v) decreases energy consumption of the system as compared to conventional approaches.

Some embodiments of the present invention, assign a fixed number of power tokens to an integrated circuit chip. The fixed number of power tokens is based on a power budget allotted to the integrated circuit chip which the circuit chip must not exceed. A rotating token pool apportions the power tokens among a plurality of frequency domains of the integrated circuit chip based on respectively corresponding workload requirements (for example, instructions per second and task utilization) of the frequency domains. As relative workload requirements shift among the frequency domains, the rotating token pool shifts power tokens away from lightly loaded frequency domains and to more heavily loaded frequency domains. By this method, the apportionment of power tokens (meaning apportionment of power usage allowance) is skewed in favor of heavily loaded frequency domains. A heavily loaded frequency domain can operate in Workload Optimized Frequency (WOF) when it receives a corresponding number of tokens from the token pool. The workload can thus be processed more quickly while not exceeding the power budget allotted to the integrated circuit chip.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar caveats apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard as to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
receiving, by a token pool, a power allowance request from a first power consuming device, of a plurality of power consuming devices, of an integrated circuit;
determining a second power consuming device, of the plurality of power consuming devices, has a power allowance surplus;
receiving the power allowance surplus from the second power consuming device;
transferring, via the token pool, the power allowance surplus to the first power consuming device; and
in response to transferring the power allowance surplus to the first power consuming device: (i) increasing a first operating frequency corresponding to the first power consuming device, based on the power allowance surplus, and (ii) decreasing a second operating frequency corresponding to the second power consuming device, based on the power allowance surplus.

2. The method of claim 1, further comprising:
iteratively interacting with the plurality of power consuming devices including the first power consuming device and the second power consuming device.

3. The method of claim 2, wherein interacting with the plurality of power consuming devices comprises:
communicating with the first power consuming device;
determining a power usage status of the first power consuming device; and
in response to determining the power usage status of the first power consuming device, transferring a first power allowance increment from the token pool to the first power consuming device.

4. The method of claim 3, wherein iteratively interacting with the plurality of power consuming devices comprises:
conducting a first round of interactions with each power consuming device, of the plurality of power consuming devices, in a first specified order, one power consuming device at a time; and
conducting a second round of interactions with each power consuming device, of the plurality of power consuming devices, in the first specified order, one power consuming device at a time.

5. The method of claim 4, wherein iteratively interacting with the plurality of power consuming devices further comprises:
conducting a third round of interactions with a subset of the plurality of power consuming devices, in a second specified order, one power consuming device at a time.

6. The method of claim 1, wherein the first power consuming device is a first frequency domain of an electronic module, and the second power consuming device is a second frequency domain of the electronic module.

7. The method of claim 1, further comprising:
in further response to transferring the power allowance surplus to the first power consuming device:
operating the first power consuming device at a workload optimized frequency; and
maintaining power consumption of the integrated circuit within a pre-determined maximum power consumption.

8. A computer program product comprising:
one or more computer readable storage media, and program instructions collectively stored on the one or more computer readable storage media, the program instructions comprising instructions programmed to perform:
receiving, by a token pool, a power allowance request from a first power consuming device, of a plurality of power consuming devices, of an integrated circuit;
in response to receiving the power allowance request, determining a second power consuming device, of the plurality of power consuming devices, has a power allowance surplus;
in response to determining the second power consuming device has the power allowance surplus, receiving the power allowance surplus from the second power consuming device;
transferring, via the token pool, the power allowance surplus to the first power consuming device; and
in response to transferring the power allowance surplus to the first power consuming device: (i) increasing a first operating frequency corresponding to the first power consuming device, based on the power allowance surplus, and (ii) decreasing a second operating frequency corresponding to the second power consuming device, based on the power allowance surplus.

9. The computer program product of claim 8, the program instructions further comprising program instructions programmed to perform:

iteratively interacting with the plurality of power consuming devices including the first power consuming device and the second power consuming device.

10. The computer program product of claim 9, wherein iteratively interacting with the plurality of power consuming devices comprises:
communicating with the first power consuming device;
determining a power usage status of the first power consuming device; and
in response to determining the power usage status of the first power consuming device, transferring a first power allowance increment from the token pool to the first power consuming device.

11. The computer program product of claim 10, wherein iteratively interacting with the plurality of power consuming devices further comprises:
conducting a first round of interactions with each power consuming device, of the plurality of power consuming devices, in a first specified order, one power consuming device at a time; and
conducting a second round of interactions with each power consuming device, of the plurality of power consuming devices, in the first specified order, one power consuming device at a time.

12. The computer program product of claim 11, wherein iteratively interacting with the plurality of power consuming devices further comprises:
conducting a third round of interactions with a subset of the plurality of power consuming devices, in a second specified order, one power consuming device at a time.

13. The computer program product of claim 8, wherein the first power consuming device is a first frequency domain of an electronic module, and the second power consuming device is a second frequency domain of the electronic module.

14. The computer program product of claim 8, the program instructions further comprising program instructions programmed to perform:
in further response to transferring the power allowance surplus to the first power consuming device;
operating the first power consuming device at a workload optimized frequency; and
maintaining power consumption of the integrated circuit within a pre-determined maximum power consumption.

15. A computer system comprising:
a processor set; and
one or more computer readable storage media;
wherein:
the processor set is structured, located, connected or programmed to run program instructions stored on the one or more computer readable storage media; and
the program instructions include instructions programmed to perform:
receiving, by a token pool, a power allowance request from a first power consuming device, of a plurality of power consuming devices, of an integrated circuit;
in response to receiving the power allowance request, determining a second power consuming device, of the plurality of power consuming devices, has a power allowance surplus;
in response to determining the second power consuming device has the power allowance surplus, receiving the power allowance surplus from the second power consuming device;
transferring, via the token pool, the power allowance surplus to the first power consuming device; and
in response to transferring the power allowance surplus to the first power consuming device: (i) increasing a first operating frequency corresponding to the first power consuming device, based on the power allowance surplus, and (ii) decreasing a second operating frequency corresponding to the second power consuming device, based on the power allowance surplus.

16. The computer system of claim 15, the program instructions further comprising program instructions programmed to perform:
iteratively interacting with the plurality of power consuming devices including the first power consuming device and the second power consuming device.

17. The computer system of claim 16, wherein iteratively interacting with the plurality of power consuming devices comprises:
communicating with the first power consuming device;
determining a power usage status of the first power consuming device; and
in response to determining the power usage status of the first power consuming device, transferring a first power allowance increment from the token pool to the first power consuming device.

18. The computer system of claim 17, wherein iteratively interacting with the plurality of power consuming devices further comprises:
conducting a first round of interactions with each power consuming device, of the plurality of power consuming devices, in a first specified order, one power consuming device at a time; and
conducting a second round of interactions with each power consuming device, of the plurality of power consuming devices, in the first specified order, one power consuming device at a time.

19. The computer system of claim 15, wherein the first power consuming device is a first frequency domain of an electronic module, and the second power consuming device is a second frequency domain of the electronic module.

20. The computer system of claim 15, the program instructions further comprising program instructions programmed to perform:
in further response to transferring the power allowance surplus to the first power consuming device;
operating the first power consuming device at a workload optimized frequency; and
maintaining power consumption of the integrated circuit within a predefined maximum power consumption.

* * * * *